US006437050B1

(12) United States Patent
Krom et al.

(10) Patent No.: US 6,437,050 B1
(45) Date of Patent: Aug. 20, 2002

(54) NANO-PARTICLE PREPARATION AND APPLICATIONS

(75) Inventors: James Krom, Belmont, MA (US); Xiaorong Wang, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/970,830

(22) Filed: Oct. 4, 2001

(51) Int. Cl.⁷ .................................................. C08F 8/00
(52) U.S. Cl. .................... 525/313; 525/314; 525/332.2; 525/332.9
(58) Field of Search ................................. 525/313, 314, 525/332.2, 332.9

(56) References Cited

U.S. PATENT DOCUMENTS

| | | | |
|---|---|---|---|
| 3,972,963 A | * 8/1976 | Schwab et al. | ............... 526/85 |
| 4,233,409 A | * 11/1980 | Bulkley | ........................ 525/71 |
| 4,247,434 A | 1/1981 | Vanderhoff et al. | |
| 4,829,135 A | 5/1989 | Gunesin et al. | |
| 4,904,730 A | * 2/1990 | Moore et al. | .................. 525/75 |
| 4,942,209 A | 7/1990 | Gunesin | |
| 5,219,945 A | * 6/1993 | Dicker et al. | ................ 525/271 |
| 5,331,035 A | 7/1994 | Hall | |
| 5,336,712 A | 8/1994 | Austgen, Jr. et al. | |
| 5,395,902 A | 3/1995 | Hall | |
| 5,614,579 A | 3/1997 | Roggeman et al. | |
| 5,688,856 A | 11/1997 | Austgen, Jr. et al. | |
| 5,763,551 A | 6/1998 | Wünsch et al. | |
| 5,847,054 A | 12/1998 | McKee et al. | |
| 5,891,947 A | 4/1999 | Hall et al. | |

\* cited by examiner

*Primary Examiner*—Bernard Lipman
(74) *Attorney, Agent, or Firm*—Meredith Palmer; Scott McCollister

(57) ABSTRACT

A polymer nano-particle composition is provided, wherein the nano-particle includes a poly(alkenylbenzene) core and a surface layer including poly(conjugated diene). The polymer nano-particles are preferably less than about 100 nm in diameter. The nano-particles can be made by a dispersion polymerization process.

20 Claims, 1 Drawing Sheet

NANO-PARTICLE PREPARATION AND APPLICATIONS

BACKGROUND OF THE INVENTION

The present invention relates to polymer nano-particles, a method for their preparation, and their use as, for example, additives for rubber, including natural and synthetic elastomers.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization.

Nano-particles can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Moreover, achieving better control over the surface composition of such polymer nano-particles also is desirable.

Rubbers may be modified by the addition of various polymer compositions. Such polymeric additives often improve the physical properties of rubber compositions. Specifically, moldability and tenacity are often approved through such modifications.

Development of nano-particles having a poly(conjugated diene) surface layer which would be compatible with a wide variety of rubbers is desirable because discrete particles could likely disperse evenly throughout the rubber to provide a uniform rubber composition. However, the solubility of diene monomers in traditional alkane solvents has made solution polymerization a difficult process by which to achieve conjugated diene nano-particles.

SUMMARY OF THE INVENTION

A polymer nano-particle composition is provided. The nano-particle includes a crosslinked poly(alkenylbenzene) core and a surface layer including poly(conjugated diene). The mean average diameter of such polymer nano-particles is preferably less than about 100 nm.

A method for forming polymer nano-particles is also provided. Alkenylbenzene monomer and conjugated diene monomer are copolymerized in a hydrocarbon solvent to form a diblock polymer. A crosslinking agent, optionally with a further vinyl-substituted aromatic hydrocarbon monomer and/or a conjugated diene monomer charge, is added to the polymerization reaction to form the nano-particles.

In another embodiment, a rubber composition is formed, wherein the above-described nano-particles are combined with at least one rubber to form a modified rubber composition with improved tensile and/or tear strength.

Herein throughout, unless specifically stated otherwise:
  "vinyl-substituted aromatic hydrocarbon" and "alkenylbenzene" are used interchangeably; and
  "rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

Figure 1:
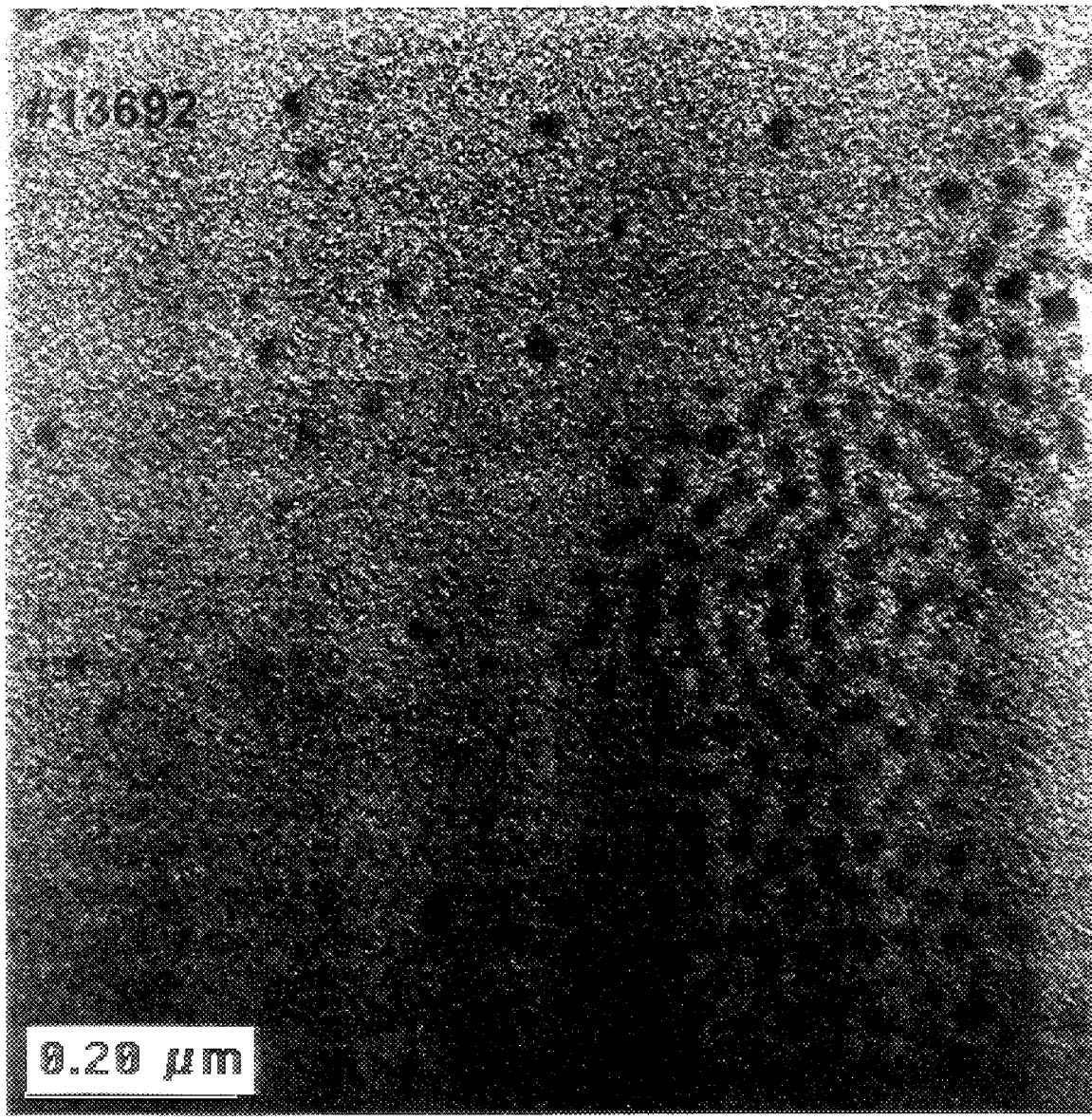
FIG. 1 is a transmission electron microscopy photograph of nano-particles of the present invention.

The polymer nano-particle is formed from diblock polymer chains having a poly(conjugated diene) block and a poly(alkenylbenzene) block. The poly(alkenylbenzene) blocks are crosslinked to form the desired nanoparticles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.1. Moreover, the nano-particles are preferably spherical, though shape defects are acceptable, provided the nano-particles generally retain their discrete nature with little or no polymerization between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature and solvent, facilitates the formation of diblock polymers which form micelles and ultimately the desired nano-particles.

According to a preferred embodiment of the invention, a first diblock polymer is formed of vinyl aromatic hydrocarbon monomers and conjugated diene monomers in the hydrocarbon solvent. The diblock polymer contains a first end block that is soluble in the dispersion solvent, preferably the conjugated diene monomer, and a second end block which is less soluble in the dispersion solvent, preferably the vinyl-substituted aromatic hydrocarbon monomer. Moreover, in one preferred embodiment, a vinyl-substituted aromatic hydrocarbon monomer is chosen which is insoluble in the dispersion solvent.

As is known in the art, such a diblock copolymer may be formed by living anionic polymerization, in which the vinyl-substituted aromatic hydrocarbon monomer is added to the completely polymerized conjugated diene monomer. Another method of forming substantially diblock polymers is the living anionic copolymerization of a mixture of a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon.

In either process, it is preferred that the conjugated diene block polymerize first, followed by the vinyl substituted aromatic, positioning the living end of the polymerizing polymer on the vinyl aromatic block to facilitate later cross-linking.

Such diblock copolymers, formed by either method, are believed to aggregate to form micelle-like structures, with for example, the vinyl-substituted aromatic blocks directed toward the centers of the micelles and the conjugated diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 50 and 80° C.

After the micelles have formed, additional conjugated diene monomer and/or vinyl-substituted aromatic hydrocarbon monomer can be added to the polymerization mixture as desired.

After formation of the micelles, a cross-linking agent is added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the derived nano-particle. Consequently, nano-particles are formed from the micelles with a core including, for example, styrene monomer units and a surface layer including, for example, butadiene monomer units.

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyl-lithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred.

Specific examples of other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Anionic initiators generally are useful in amounts ranging from about 0.01 to 60 millimoles per hundred grams of monomer charge.

The conjugated diene monomers contemplated for the diblock polymer are those soluble in non-aromatic hydrocarbon solvents. $C_4$–$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons.

The diblock polymer, preferably has $M_w$ of about 5,000 to 200,000, more preferably between about 10,000 and 100,000. A typical diblock polymer will be comprised of 10 to 90% by weight conjugated diene and 10 to 90% by weight vinyl-substituted aromatic hydrocarbon, more preferably 30 to 70% by weight, and most preferably 40 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

Without being bound by theory, it is believed that an exemplary micelle will be comprised of ten to thirty diblock polymers yielding, after crosslinking, a nano-particle having a $M_w$ of between about 100,000 to 3,000,000, preferably between about 500,000 to 1,500,000.

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 400 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 5% and 95%, and preferably less than about 35%.

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, the present polymer nano-particles are advantageous because the surface layer of poly(conjugated diene), especially vinyl-modified poly(conjugated diene), is capable of bonding with the rubber matrix due to the accessibility of the pendant vinyl groups.

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the nano-particles demonstrate improved tensile and tear strength of at least about 30% over non-spherical copolymers.

One application for such rubber compounds is in tire rubber formulations. Specifically, they are contemplated for use in rubber compounds used to make tire treads and side walls.

The present invention now will be described with reference to non-limiting examples. The following examples and tables are presented for purposes of illustration only and are not to be construed in a limiting sense.

EXAMPLES

Preparation of Polymers

A 7.6 L reactor equipped with external jacked heating and internal agitation was used for all polymerizations. 1,3-Butadiene was used as a 22.0 or 21.1 weight percent solution in hexane. Styrene was used as a 33.0 wt % solution in hexane, and n-butyllithium was used as a 15 wt % solution in hexane. The antioxidant butylated hydroxytoluene (BHT, Aldrich Chem. Co., Milwaukee, Wis.) was used as an approximately 17 wt % solution in hexane. Technical grade divinylbenzene (DVB, 80% as a mixture of isomers, Aldrich) was passed through a column of inhibitor remover under $N_2$ before use. Neat bis-oxalanyl propane (OOPs, Aldrich) was similarly treated and used as a 1.6M solution in hexane, stored over calcium hydride.

EXAMPLE 1

Preparation of Diblock Polymers:

The reactor was charged with 1.03 kg of 22% butadiene, 0.55 kg hexane, and 0.70 kg styrene (33 wt %). The batch was heated to 57° C., followed by initiation of polymerization with 5.0 mL n-BuLi (1.6 M) diluted in 30 mL hexane. The temperature was maintained at 57° C. for the duration of the polymerization.

Particle Formation:

Following the diblock polymer preparation, the reactor jacket was set to 26° C. The reactor was charged with 1.36 kg styrene (33 wt %) diluted with an additional 0.90 kg hexane, followed by 50 mL DVB containing 1.0 mL OOPs. The reactor jacket was set to 50° C. The exotherm peaked at 54° C. about 30 minutes after the addition of the DVB/OOPs mixture. About half of the batch was dropped into dried, $N_2$ purged bottles, and polymerization was terminated with about 1 mL isopropanol and treated with about 3 mL BHT solution. For transmission electron microscopy (TEM) analysis, about 10 mL of solution was taken from the batch and further diluted with the hexane solvent to about $10^{-4}$ wt %. A drop of the diluted solution was then deposited on a formvar-carbon coated micro-grid. After the solvent was evaporated, the grid was stained with $OSO_4$, and then examined by TEM. The results showed that the average particle diameter was about 50 nm with dispersity of about 1.1.

EXAMPLE 2

The diblock polymer was prepared as described above. Particle formation was also performed as described above, except 1.22 kg of styrene (33 wt %) 1.0 kg hexane, and 100 mL of DVB containing 1.0 mL of OOPs solution was used. The jacket temperature was raised to 57° C., then 65° C. overnight because no exotherm was observed. Half of the batch was dropped into bottles and terminated as described above. The particles constituted about 18% by weight of the mixture. To the remainder of the batch was added 2.27 kg of 21.6% butadiene, but no polymerization occurred. Further polymerization was initiated with a charge of 2.5 mL of n-BuLi (1.6 M solution) and the batch subsequently gelled.

EXAMPLE 3

The dispersant was prepared as described above, except 1.8 kg of butadiene (22 wt %) was used. The living dispersant was diluted with 0.91 kg hexane, and a solution of 0.453 kg DVB in 0.91 kg hexane was charged into the reactor. The reactor temperature control was switched from batch control at 57° C. to jacket at 57° C. After about 4 hours, the batch was dropped into bottles and terminated as described above. The particles constituted about 11% by weight of the mixture. The GPC analysis showed that the particle had a $M_n$ of about 976,000. The polydispersity of the molecular weight was 1.11. The nano-particles were examined by TEM and had an average particle size of about 15 nm, and a dispersity of particle size of about 1.1 (FIG. 1).

Application of the Particles in Rubber Compounds

Four kinds of rubber compositions were prepared according to the formulation shown in Tables 1 and 2 by selectively using the synthesized particles to replace the amount of polymer (polybutadiene) in the compound formulation. The physical details of these compositions are shown in Table 3. Two controls were used (Examples 4 and 5) to provide a comparison with the test compounds (Examples 6 and 7) wherein the nano-particles were derived from Example 3. In each sample, a blend of the ingredients was kneaded by the method described in Table 4. The final stock was sheeted and molded at 160° C. for 30 minutes.

The physical characteristics of the rubber compounds shown in Table 3 were measured by accepted standards in the art. The tensile strength measurements were based on conditions of ASTM-D 412 at 22° C. Test specimen geometry was taken in the form of a ring of a width of 0.127 cm and of a thickness of 0.197 cm. The specimen was tested at a specific gauge length of 2.54 cm. The measurement of tear strength was based on conditions of ASTM-D 624 at 170° C. Test specimen geometry was taken in the form of a nicked ring (ASTM-624-C). The specimen was tested at the specific gauge length 11.29 cm. The hysteresis loss was measured with a Dynastat Viscoelastic Analyzer. Test specimen geometry was taken in the form of a strip of a length of 30 mm and of a width of 15 mm. A frequency of 5 Hz at 2% strain was employed. Measurement of the wet traction was performed on the British Portable Skid Tester. The sample geometry for the test was a rectangular bar of 2.54×7.6×0.64 cm.

As seen in Table 3, the rubber compositions of Examples 6 and 7 exhibit balanced physical properties. The tensile strength and tear strength of the modified rubber compounds are ~30% better than those of the comparative compounds at equal modulus.

TABLE 1

Composition of Master Batch

| Component | Concentration (pbw) |
|---|---|
| Rubber | 100 |
| Carbon black | 50 |
| Aromatic oil | 15 |
| Zinc oxide | 3 |
| Hydrocarbon resin (tackifiers) | 2 |
| Antioxidants | 0.95 |
| Stearic Acid | 2 |
| Wax | 1 |

TABLE 2

Composition for Final Batch

| Component | Concentration (pbw) |
|---|---|
| Sulfur (curing agent) | ~1.30 |
| Cyclohexyl-benzothiazole sulfenamide (accelerator) | 1.4 |
| Diphenylguanidine (accelerator) | .2 |

TABLE 3

Physical Characteristics of Rubber Formulations

| Example | 4 | 5 | 6 | 7 |
|---|---|---|---|---|
| Nano-particle (pbw) | 0 | 0 | 10 | 10 |
| Butadiene rubber (pbw) | 100 | 100 | 90 | 90 |
| Carbon black (pbw) | 50 | 50 | 50 | 50 |
| Aromatic oil (pbw) | 15 | 15 | 15 | 15 |
| Sulfur (pbw) | 1.3 | 1.9 | 1.4 | 1.6 |
| Mooney Viscosity | 89.2 | 86.8 | 82.98 | 82.9 |
| CB Dispersion index | 96.3 | 97.2 | 99 | 98.5 |
| Shore A | | | | |
| 22° C. (3 sec) | 64.1 | 66.4 | 67.2 | 68.3 |
| 100° C. (3 sec) | 62.7 | 64.6 | 63.3 | 64.9 |
| Ring Tensile (23° C.) | | | | |
| Tb (kPa) | 12,786 | 13,158 | 16,598 | 13,138 |
| Eb (%) | 444 | 373 | 502 | 382 |
| Tb*Eb (breaking energy) | 5,676,984 | 4,907,934 | 8,332,196 | 5,018,716 |
| Modulus at 300% Elongation (psi) | 988 | 1242 | 1116 | 1334 |
| Modulus at 50% Elongation (psi) | 188 | 219 | 215 | 240 |
| Ring Tear (170° C.) | | | | |
| Strength (kg/cm) | 33.5 | 27.8 | 39.7 | 37.2 |
| Travel (%) | 320 | 175 | 358 | 291 |
| $T_g$ (° C.) | −76 | −75 | −76 | −75 |
| Temp Sweep (2% strain) | | | | |
| tan δ @ 50° C. | 0.1343 | 0.1171 | 0.1721 | 0.1695 |
| tan δ @ 20° C. | 0.1559 | 0.1422 | 0.1874 | 0.1881 |
| tan δ @ 0° C. | 0.1698 | 0.1598 | 0.1961 | 0.2002 |

TABLE 4

Mixing Conditions

| | | |
|---|---|---|
| Mixer | | 300 g Brabender |
| Agitation Speed | | 60 rpm |
| Master Batch Stage | | |
| Initial Temperature | | 110° C. |
| | 0 minutes | Charging polymers |
| | 0.5 minutes | Charging oil and carbon black |
| | 5.0 minutes | Drop |
| Final Batch Stage | | |
| Initial Temperature | | 75° C. |
| | 0 seconds | Charging master stock |
| | 30 seconds | Charging curing agent |
| | 75 seconds | drop |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A polymer nano-particle composition comprising:
   a. a poly(alkenylbenzene) core, and
   b. a surface layer comprising poly(conjugated diene), wherein said nano-particles have a mean average diameter of less than about 100 nm.

2. The composition of claim 1 further comprising an initiator residue derived from an anionic polymerization initiator.

3. The composition of claim 1 wherein said poly(alkenylbenzene) comprises monomer contributed units from one or more of styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons.

4. The composition of claim 1 further comprising a crosslinking agent.

5. The composition of claim 4 wherein said crosslinking agent comprises a multi-functional organic compound.

6. The composition of claim 1 wherein said poly(conjugated diene) comprises monomer contributed units selected from 1,3-butadiene, isoprene, 1,3-pentadiene, and mixtures thereof.

7. The composition of claim 1 wherein said poly(conjugated diene) includes a 1,2 microstructure content of at least about 35%.

8. The composition of claim 1 wherein said nano-particles have a mean average diameter of less than 75 nm.

9. A process for forming polymer nano-particles comprising:
   a. polymerizing alkenylbenzene monomer and conjugated diene monomer in a hydrocarbon solvent to form a diblock polymer;
   b. forming a polymerization mixture including micelles of said diblock polymer; and
   c. adding at least one crosslinking agent to the polymerization mixture to form crosslinked nano-particles from said micelles, said nano-particles comprising an alkenylbenzene core and conjugated diene surface.

10. The process of claim 9 wherein step a is performed in the presence of a lithium initiator.

11. The process of claim 9 wherein subsequent to step a, further hydrocarbon solvent is added to the polymerization mixture.

12. The process of claim 9 wherein said alkenylbenzene is one or more of styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons.

13. The process of claim 9 wherein said crosslinking agent is a multifunctional organic compound.

14. The process of claim 9 wherein said conjugated diene monomer is chosen from one or more of 1,3-butadiene, isoprene, and 1,3-pentadiene.

15. The process of claim 9 wherein said nano-particles have a mean average diameter of less than 100 nm.

16. The process of claim 9 wherein said hydrocarbon solvent is selected from one or more of pentane, hexane, heptane, octane, nonane, decane, cyclohexane, methyl cyclopentane, cyclooctane, cyclopentane, cycloheptane, cyclononane, and cyclodecane.

17. The process of claim 9 wherein polymerization step a is performed at between about −40 and 200° C.

18. A polymer nano-particle comprising a conjugated diene contributed monomer unit outer surface, a vinyl-substituted aromatic hydrocarbon contributed unit core including a crosslinking agent, and wherein said nano-particles are less than about 100 nm in diameter and have a $M_w$ between about 100,000 and 3,000,000.

19. A rubber composition comprising a blend of rubber and a plurality of said polymer nano-particles of claim 18.

20. The composition of claim 19 wherein said rubber is one or more of styrene butadiene rubber, butadiene rubber, isoprene, nitrile rubber, polyurethane, butyl rubber, ethylene-propylene-diene-monomer.

* * * * *